(12) United States Patent
Tanaka et al.

(10) Patent No.: US 11,349,127 B2
(45) Date of Patent: May 31, 2022

(54) CELL STACK AND ELECTROCHEMICAL CELL

(71) Applicant: NGK INSULATORS, LTD., Nagoya (JP)

(72) Inventors: Yuki Tanaka, Nagoya (JP); Toshiyuki Nakamura, Handa (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/951,381

(22) Filed: Nov. 18, 2020

(65) Prior Publication Data

US 2021/0075022 A1 Mar. 11, 2021

Related U.S. Application Data

(63) Continuation of application No. PCT/JP2019/006757, filed on Feb. 22, 2019.

(30) Foreign Application Priority Data

Jun. 12, 2018 (JP) .............................. JP2018-111683
Jun. 12, 2018 (JP) .............................. JP2018-111684

(Continued)

(51) Int. Cl.
*H01M 4/66* (2006.01)
*H01M 4/70* (2006.01)

(52) U.S. Cl.
CPC ........... *H01M 4/667* (2013.01); *H01M 4/662* (2013.01)

(58) Field of Classification Search
None
See application file for complete search history.

(56) References Cited

U.S. PATENT DOCUMENTS 9,350,027 B2 * 5/2016 Kageyama .............. C23C 16/50
9,786,927 B2 * 10/2017 Higashi ............... H01M 8/0228
(Continued)

FOREIGN PATENT DOCUMENTS

JP 201312397 A 1/2013
JP 2016181350 A 10/2016
(Continued)

OTHER PUBLICATIONS

International Search Report with English Translation issued in corresponding International Application No. PCT/JP2019/006757 dated Apr. 23, 2019 (6 pages).

(Continued)

*Primary Examiner* — Tracy M Dove
(74) *Attorney, Agent, or Firm* — Flynn Thiel, P.C.

(57) ABSTRACT

In a cell stack, each of the plurality of the electrochemical cells includes an alloy member, a first electrode layer, a second electrode layer, and an electrolyte layer. The alloy member includes a base member constituted by an alloy material containing chromium, a coating film that covers at least a part of a surface of the base member, and a separation inhibiting portion that inhibits the coating film from separating from the base member. The number of the separation inhibiting portions included in the alloy member of the central electrochemical cell is larger than the number of the separation inhibiting portions included in the alloy member of the end electrochemical cell.

8 Claims, 9 Drawing Sheets

(30) Foreign Application Priority Data

Oct. 4, 2018 (JP) .............................. JP2018-189229
Oct. 18, 2018 (JP) .............................. JP2018-197004

(56) References Cited

U.S. PATENT DOCUMENTS

| | | | | |
|---|---|---|---|---|
| 2015/0086905 A1* | 3/2015 | Fujimoto | ............ | H01M 8/0245 429/520 |
| 2015/0155571 A1 | 6/2015 | Higashi | | |
| 2020/0152998 A1* | 5/2020 | Tanaka | .................... | C25B 15/08 |

FOREIGN PATENT DOCUMENTS

| | | |
|---|---|---|
| JP | 201798145 A | 6/2017 |
| JP | 6188181 B1 | 8/2017 |
| JP | 2017157476 A | 9/2017 |
| WO | 2013172451 A1 | 11/2013 |

OTHER PUBLICATIONS

Written Opinion of International Searching Authority with English Translation issued in corresponding International Application No. PCT/JP2019/006757 dated Apr. 23, 2019 (6 pages).
U.S. Patent Publication No. 2020/0144632 A1, published on May 7, 2020.

\* cited by examiner

CELL STACK AND ELECTROCHEMICAL CELL

CROSS-REFERENCE TO RELATED APPLICATIONS

This is a continuation of PCT/JP2019/006757, filed Feb. 22, 2019, which claims priority from Japanese Application Nos. 2018-111683, filed Jun. 12, 2018, 2018-111684, filed Jun. 12, 2018, 2018-189229, filed Oct. 4, 2018 and 2018-197004, filed Oct. 18, 2018 the entire contents of which are hereby incorporated by reference.

TECHNICAL FIELD

The present invention relates to a cell stack and an electrochemical cell.

BACKGROUND ART

Conventionally, as an alloy member used in an electrochemical cell such as a fuel cell, an alloy member in which a base member is covered with a coating film has been proposed (for example, see International Publication No. 2013/172451).

The alloy member is capable of inhibiting the volatilization of Cr from a base member constituted by an Fe—Cr alloy or a Ni—Cr alloy.

SUMMARY

However, in the alloy member described in International Publication No. 2013/172451, there is a risk that a coating film may be separated from the base member due to the difference in thermal expansion coefficient between the base member and the coating film.

The present invention has been invented in view of the above circumstances, and the object thereof is to provide a cell stack and an electrochemical cell capable of inhibiting a coating film from separating from an alloy member.

A cell stack according to the present invention has a plurality of electrochemical cells disposed in an arrangement direction. Each of the plurality of the electrochemical cells includes an alloy member, a first electrode layer supported by the alloy member, a second electrode layer, and an electrolyte layer disposed between the first electrode layer and the second electrode layer. The alloy member includes a base member constituted by an alloy material containing chromium, a coating film that covers at least a part of a surface of the base member, and a separation inhibiting portion that inhibits the coating film from separating from the base member. The plurality of the electrochemical cells includes a central electrochemical cell located at a central portion in the arrangement direction and an end electrochemical cell located at an end portion in the arrangement direction. The number of the separation inhibiting portions included in the alloy member of the central electrochemical cell is larger than the number of the separation inhibiting portions included in the alloy member of the end electrochemical cell.

An electrochemical cell according to the present invention has an alloy member, a first electrode layer supported by the alloy member, a second electrode layer and an electrolyte layer disposed between the first electrode layer and the second electrode layer. The alloy member includes a base member constituted by an alloy material containing chromium, a coating film that covers at least a part of a surface of the base member, and a separation inhibiting portion that inhibits the coating film from separating from the base member. The alloy member includes a downstream portion located on a downstream side in a flow direction of a gas flowing on a surface of the alloy member, and an upstream portion located on an upstream side of the downstream portion in the flow direction. The number of the separation inhibiting portions included in the downstream portion is larger than the number of the separation inhibiting portions included in the upstream portion.

According to the present invention, it is possible to provide a cell stack and an electrochemical cell capable of inhibiting a coating film from separating from a base member.

DESCRIPTION OF EMBODIMENTS

1. First Embodiment

Configuration of Cell Stack Device 10

Figure 1:
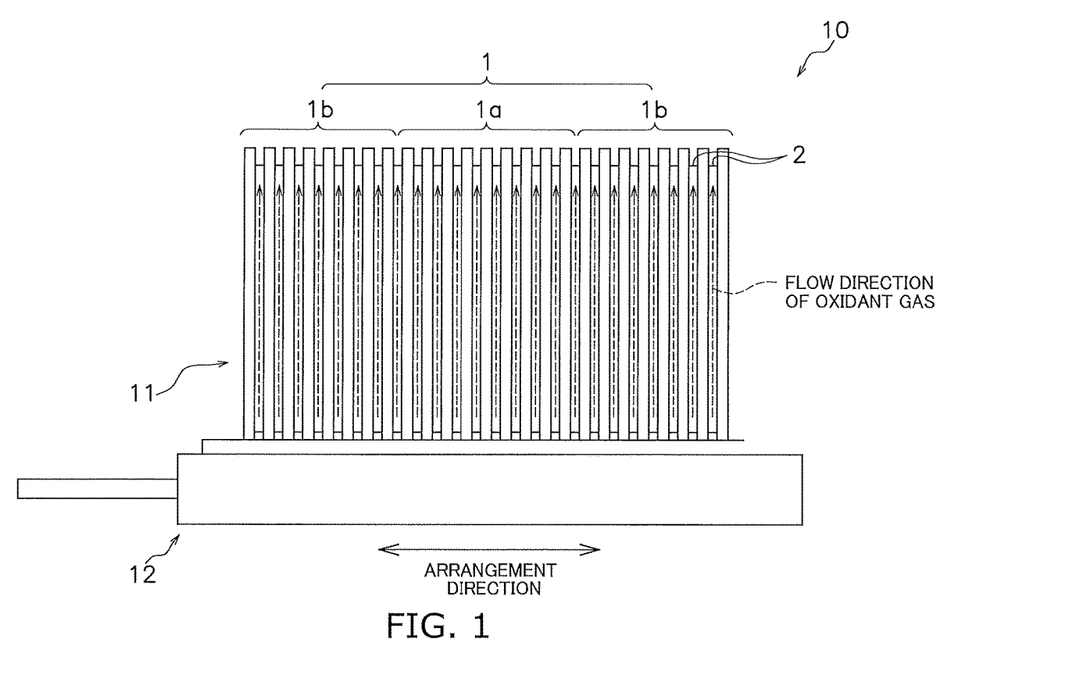
FIG. 1 is a side view of a cell stack device 10 according to the first embodiment.

FIG. 1 is a side view of a cell stack device 10 according to the first embodiment. The cell stack device 10 comprises a cell stack 11 and a manifold 12.

The cell stack 11 includes a plurality of fuel cells 1 and a plurality of current collecting members 2. The fuel cell 1 is an example of "electrochemical cell" according to the present invention. "Electrochemical cell" is a concept including a fuel cell and an electrolysis cell for producing hydrogen and oxygen from water vapor. In the following description, the fuel cell is abbreviated as "cell".

A plurality of the cells 1 is disposed in a line along the arrangement direction. A base end portion of each cell 1 is fixed to a manifold 12. A distal end portion of each cell 1 is a free end. Thus, each cell 1 is supported by the manifold 12 in a cantilevered state.

A plurality of the cells 1 includes central cells 1a (an example of a central electrochemical cell) and end cells 1b (an example of an end electrochemical cell) disposed on both sides of the central cells 1a in the arrangement direction.

The central cell 1a are the cells 1 disposed at the central portion of the cell stack 11 in the arrangement direction among a plurality of the cells 1. The central portion in the arrangement direction is a region centered on the center in the arrangement direction of the cell stack 11 and set to a region of about one-third of the entire length of the cell stack 11. Although as illustrated in FIG. 1, in this embodiment, the nine cells 1 are the central cells 1a, the number of the central cells 1a can be appropriately changed depending on the total length of a plurality of the cells 1 and the size of each cell 1.

The end cells 1b are the cells 1 disposed at the end potions of the cell stack 11 in the arrangement direction among the plurality of the cells 1. The end potions in the arrangement direction are set to regions of about one-third of the entire length of the cell stack 11 from both ends in the arrangement direction of the cell stack 11. Although as illustrated in FIG. 1, in this embodiment, the eight cells 1 disposed on both sides of the nine central cells 1a are the end cells 1b, the number of the end cells 1b can be appropriately changed depending on the total length of a plurality of the cells 1 and the size of each cell 1.

A cell 1 that does not belong to either the central cell 1a or the end cell 1b may be disposed between the central cell 1a and the end cells 1b.

Two adjacent cells 1 are disposed so as to face each other. Between each of the main surfaces of two adjacent cells 1, a space in which an oxidant gas (for example, air) flows is formed. Oxidant gas flows between two adjacent cells 1 along a flow direction substantially perpendicular to the arrangement direction of the cells 1. In this embodiment, the flow direction of oxidant gas is the direction away from the manifold 12 in the side view of the cell stack 11. Since a current collecting member 2 is disposed between the two adjacent cells 1, oxidant gas flows through the gap between the current collecting members 2.

The current collecting member 2 is disposed between two adjacent cells 1. The current collecting member 2 electrically connects two adjacent cells 1. The shape and size of the current collecting member 2 are not particularly limited as long as they can direct oxidant gas to the cell 1. The current collecting member 2 preferably has a shape that does not block the flow of oxidant gas.

The current collecting member 2 is fixed to the cell 1 via a conductive bonding material (not illustrated). Although a conductive ceramic material is suitable as the conductive bonding material, a conductive bonding material is not limited thereto. Although at least one type chosen from LSCF ((La, Sr)(Co, Fe)O$_3$: lanthanum strontium cobalt ferrite), LSF ((La, Sr)FeO$_3$:lanthanum strontium ferrite), LSC ((La, Sr)CoO$_3$: Lanthanum strontium cobaltite), LNF (La(Ni, Fe)O$_3$: lanthanum nickel ferrite) and LSM ((La, Sr)MnO$_3$: lanthanum strontium manganate) or the like can be used as the conductive ceramic material, the conductive ceramic material is not limited thereto.

Inside the manifold 12, an internal space into which a fuel gas (for example, hydrogen gas) is supplied from the outside is formed. Fuel gas supplied to the internal space is distributed to each cell 1. The manifold 12 may be configured so that the base end portion of each cell 1 is fixed and fuel gas can be supplied to each cell 1, and its shape and size are not particularly limited.

Configuration of Cell 1

Figure 2:
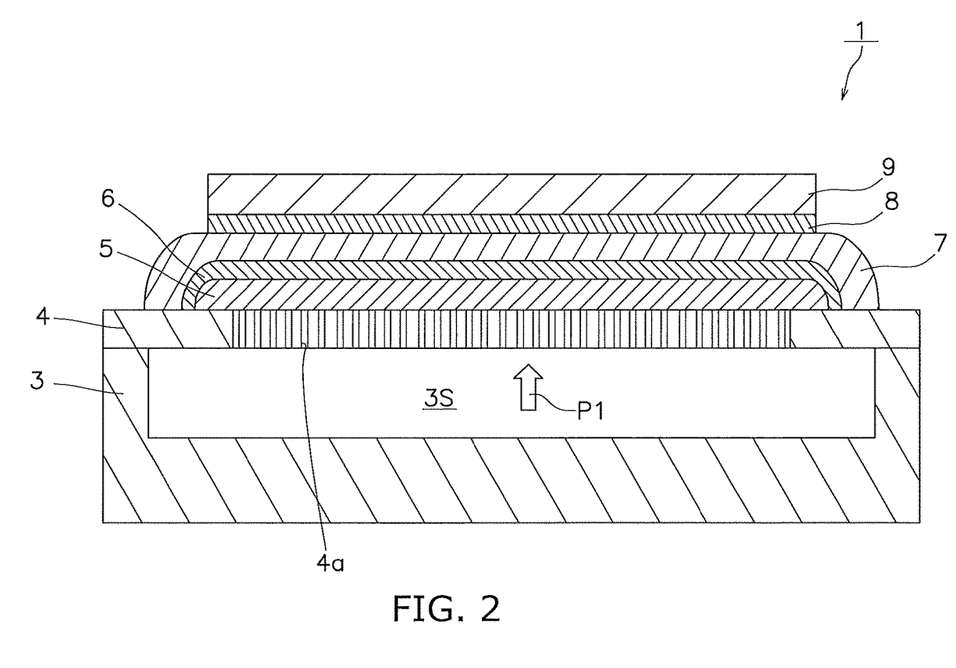
FIG. 2 is a cross-sectional view showing the configuration of a cell 1 according to the first embodiment.

FIG. 2 is a cross-sectional view showing the configuration of the cell 1 according to the first embodiment. The cell 1 includes a flow path member 3, an alloy member 4, a first electrode layer 5, an intermediate layer 6, an electrolyte layer 7, a barrier layer 8, and a second electrode layer 9.

Flow Path Member 3

The flow path member 3 is formed in a U shape. The flow path member 3 is joined to the alloy member 4. A flow path 3S is formed between the flow path member 3 and the alloy member 4.

The flow path 3S is connected to the internal space of the manifold 12 (see FIG. 1). Fuel gas flowing from the internal space of the manifold 12 into the flow passage 3S flows in the flow passage 3S from the base end side toward the distal end portion side of the cell 1. The residual fuel gas that has not been used for power generation in the cell 1 is discharged from a discharge port provided on the distal end portion side of the flow path 3S. The flow path member 3 can be constituted by, for example, an alloy material. The flow path member 3 may include the same configuration as the alloy member 4.

Alloy Member 4

The alloy member 4 is a support body that supports the first electrode layer 5, the intermediate layer 6, the electrolyte layer 7, the barrier layer 8, and the second electrode layer 9. Although in this embodiment, the alloy member 4 is formed in a plate shape, the shape is not limited thereto. The alloy member 4 may have another shape, for example, such as a tubular shape or a box shape.

A plurality of through holes 4a are formed in a region joined to the first electrode layer 5 in the alloy member 4. Fuel gas flowing in the flow path 3S is supplied to the first electrode layer 5 via each through hole 4a. Each through hole 4a can be formed by mechanical processing (for example, punching processing), laser processing, or chemical processing (for example, etching processing), or the like. Alternatively, the alloy member 4 may be constituted by a porous metal having a gas permeability. In this case, since the hole formed in the porous metal functions as the through hole 4a, it is not necessary to perform a process for forming the through hole 4a.

The alloy member 4 has only to maintain the strength of the cell 1. Although the thickness thereof is not particularly limited, the thickness can be, for example, 0.1 mm to 2.0 mm.

Figure 3:
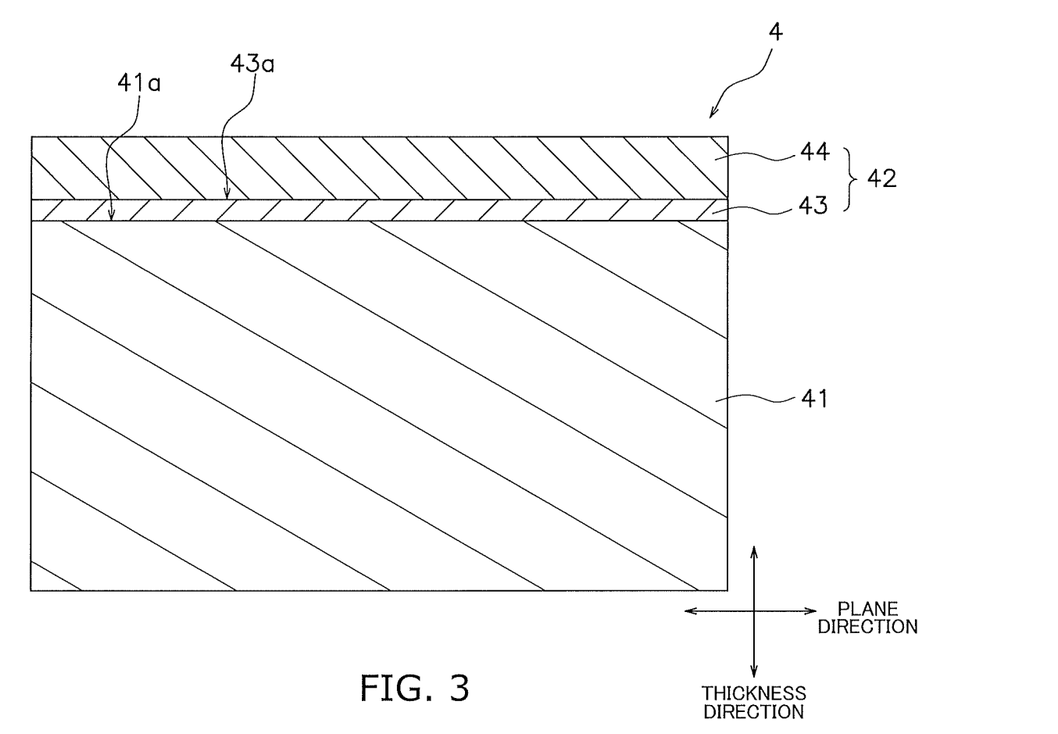
FIG. 3 is a cross-sectional view showing the configuration near the surface of an alloy member 4 according to the first embodiment.

Here, FIG. 3 is a cross-sectional view showing the configuration near the surface of the alloy member 4. In FIG. 3, a cross-section perpendicular to the surface of the alloy member 4 is illustrated.

As illustrated in FIG. 3, the alloy member 4 includes a base member 41 and a coating film 42.

The base member 41 is constituted by an alloy material containing Cr (chromium). As the metal material, Fe—Cr alloy steel (such as stainless steel) or Ni—Cr alloy steel can be used. Although the Cr content in the base member 41 is not particularly limited, it can be 4 to 30 mass %.

The base member 41 may contain Ti (titanium) or Al (aluminum). Although the Ti content in the base member 41 is not particularly limited, it can be 0.01 to 1.0 at. %. Although the Al content in the base member 41 is not particularly limited, it can be 0.01 to 0.4 at. %. The base member 41 may contain Ti as TiO$_2$ (titania) or Al as Al$_2$O$_3$ (alumina).

The coating film 42 covers at least a part of the base member 41. The coating film 42 may cover the inner peripheral surface of the through hole 4a.

In this embodiment, the coating film 42 includes a chromium oxide film 43 and a covering film 44.

The chromium oxide film 43 is formed on a surface 41a of the base member 41. The chromium oxide film 43 covers at least a part of the surface 41a of the base member 41. Although the chromium oxide film 43 may cover at least a part of the surface 41a of the base member 41, the chromium oxide film 43 may cover almost the entire surface 41a. The chromium oxide film 43 contains chromium oxide as the main component. In this embodiment, a composition X containing a substance Y "as the main component" means that the substance Y accounts for 70 wt % or more of the entire composition X. Although the thickness of the chromium oxide film 43 is not particularly limited, the thickness can be 0.1 to 20 µm, for example.

The covering film 44 is formed on a surface 43a of the chromium oxide film 43. The covering film 44 covers at least a part of the surface 43a of the chromium oxide film 43. Although the covering film 44 may cover at least a part of the surface 43a of the chromium oxide film 43, the covering film 44 may cover substantially the entire surface 43a. In particular, the covering film 44 preferably covers the region in contact with the oxidizing gas of the surface 43a of the chromium oxide film 43. Although the thickness of the covering film 44 is not particularly limited, the thickness is, for example, 1 to 200 µm.

The covering film 44 inhibits the volatilization of Cr from the base member 41. As a result, an electrode of each fuel cell 9 (in this embodiment, a cathode) can be inhibited from being deteriorated by Cr poisoning.

As a material forming the covering film 44, a conductive ceramic material can be used. As the conductive ceramic material, for example, a perovskite-type composite oxide containing La and Sr, a spinel-type composite oxide constituted by a transition metal such as Mn, Co, Ni, Fe, Cu or the like can be used.

Since in such an alloy member 4, the coefficient of thermal expansion of the base member 41 and the coefficient of thermal expansion of the coating film 42 are different, thermal stress occurs between the base member 41 and the coating film 42 every time the cell 1 is repeatedly activated and deactivated. Therefore, the coating film 42 may be separated from the base member 41.

Therefore, the alloy member 4 according to this embodiment is provided with "a separation inhibiting portion" for inhibiting the coating film 42 from separating from the base member 41. Details of the separation inhibiting portion will be described later.

First Electrode Layer 5

The first electrode layer 5 is supported by the alloy member 4. The first electrode layer 5 is provided on the front surface side of the alloy member 4. The first electrode layer 5 is provided so as to cover the region of the alloy member 4 in which a plurality of the through holes 4a is provided. Although in FIG. 2, the first electrode layer 5 is disposed on the surface of the alloy member 4 and does not enter the through holes 4a, at least a part of the first electrode layer 5 may enter the through holes 4a. Since the connection between the alloy member 4 and the first electrode layer 5 is improved by the first electrode layer 5 entering each through hole 4a, it can prevent the first electrode layer 5 from separating from the alloy member 4 by thermal stress generated between the alloy member 4 and the first electrode layer 5.

The first electrode layer 5 is preferably porous. Although the porosity of the first electrode layer 5 is not particularly limited, the porosity can be 20% to 70%, for example. Although the thickness of the first electrode layer 5 is not particularly limited, the thickness can be 1 µm to 100 µm, for example.

In this embodiment, the first electrode layer 5 functions as an anode (fuel electrode). The first electrode layer 5 is constituted by NiO-GDC (gadolinium-doped ceria), Ni-GDC, NiO—YSZ (yttria-stabilized zirconia), Ni—YSZ, $CuO$—$CeO_2$, Cu—$CeO_2$ and other composite materials.

The method for forming the first electrode layer 5 is not particularly limited, and the first electrode layer 5 can be formed by a firing method, a spray coating method (a thermal spraying method, an aerosol deposition method, an aerosol gas deposition method, a powder jet deposition method, a particle jet deposition method, a cold spray method or the like), a PVD method (a sputtering method, a pulse laser deposition method or the like), a CVD method, or the like.

Intermediate Layer 6

The intermediate layer 6 is disposed on the first electrode layer 5. The intermediate layer 6 is interposed between the first electrode layer 5 and the electrolyte layer 7. Although the thickness of the intermediate layer 6 is not particularly limited, the thickness can be 1 µm to 100 µm, for example.

The intermediate layer 6 preferably has an oxide ion (oxygen ion) conductivity. The intermediate layer 6 more preferably has an electronic conductivity. The intermediate layer 6 can be constituted by YSZ, GDC, SSZ (scandium-stabilized zirconia), SDC (samarium-doped ceria), or the like. The method for forming the intermediate layer 6 is not particularly limited, and the intermediate layer 6 can be formed by a firing method, a spray coating method, a PVD method, a CVD method or the like.

Electrolyte Layer 7

The electrolyte layer 7 is disposed between the first electrode layer 5 and the second electrode layer 9. Since in this embodiment, the cell 1 includes the intermediate layer 6 and the barrier layer 8, the electrolyte layer 7 is interposed between the intermediate layer 6 and the barrier layer 8.

In this embodiment, the electrolyte layer 7 is formed so as to cover the entire first electrode layer 5, and the outer edge of the electrolyte layer 7 is joined to the alloy member 4. As a result, since mixing of oxidant gas and fuel gas can be inhibited, it is not necessary to separately seal between the alloy member 4 and the electrolyte layer 7.

The electrolyte layer 7 has an oxide ion conductivity. The electrolyte layer 7 includes a gas barrier property enough to inhibit mixing of oxidant gas and fuel gas. Although the electrolyte layer 7 may have a multilayer structure, at least one layer is preferably a dense layer. The porosity of the dense layer is preferably 10% or less, more preferably 5% or less, still more preferably 2% or less. Although the thickness of the electrolyte layer 7 is not particularly limited, the thickness may be 1 µm to 10 µm, for example.

The electrolyte layer 7 can be constituted by YSZ, GDC, SSZ, SDC, LSGM, or the like. The method for forming the electrolyte layer 7 is not particularly limited, and the electrolyte layer 7 can be formed by a firing method, a spray coating method, a PVD method, a CVD method, or the like.

Barrier Layer 8

The barrier layer 8 is disposed on the electrolyte layer 7. The barrier layer 8 is interposed between the electrolyte layer 7 and the second electrode layer 9. Although the thickness of the barrier layer 8 is not particularly limited, the thickness can be 1 µm to 100 µm, for example. The barrier layer 8 inhibits the formation of a high resistance layer by the reaction between the constituent material of the second electrode layer 9 and the constituent material of the electrolyte layer 7.

The barrier layer 8 can be constituted by a ceria-based material such as GDC or SDC. The method for forming the reaction preventive layer 8 is not particularly limited, and the reaction preventive layer 8 can be formed by a firing method, a spray coating method, a PVD method, a CVD method, or the like.

Second Electrode Layer 9

The second electrode layer 9 is disposed on the opposite side of the first electrode layer 5 with respect to the electrolyte layer 7. Since in this embodiment, the cell 1 includes the barrier layer 8, the second electrode layer 9 is disposed on the barrier layer 8.

The second electrode layer 9 is preferably porous. Although the porosity of the second electrode layer 9 is not particularly limited, the porosity can be 20% to 70%, for example. Although the thickness of the second electrode layer 9 is not particularly limited, the thickness may be 1 μm to 100 μm, for example.

In this embodiment, the second electrode layer 9 functions as a cathode (air electrode). The second electrode layer 9 can be constituted by LSCF, LSF, LSC, LNF, LSM, or the like. In particular, the second electrode layer 9 preferably contains a perovskite oxide containing two or more kinds of elements selected from the group consisting of La, Sr, Sm, Mn, Co and Fe.

The method for forming the second electrode layer 9 is not particularly limited, and the second electrode layer 9 can be formed by a firing method, a spray coating method, a PVD method, a CVD method, or the like.

Operation of Cell 1

First, while fuel gas is supplied from the flow path 3S to the first electrode layer 5 through each through hole 4a and oxidant gas is supplied to the second electrode layer 9, the cell 1 is heated up at an operating temperature (for example, 600 to 850 degrees C.). Then, in the second electrode layer 9, $O_2$ (oxygen) reacts with $e^-$ (electron) to generate $O^{2-}$ (oxygen ion). The generated $O^{2-}$ moves to the first electrode layer 5 through the electrolyte layer 7. $O^{2-}$ that has moved to the first electrode layer 5 reacts with $H^2$ (hydrogen) contained in the fuel gas to generate $H_2O$ (water) and $e^-$. Due to such a reaction, an electromotive force is generated between the first electrode layer 5 and the second electrode layer 9.

Separation Inhibiting Portion Provided on Alloy Member 4

As described above, the alloy member 4 according to this embodiment is provided with the separation inhibiting portion for inhibiting the coating film 42 from separating from the base member 41.

Here, in the end cell 1b, Joule heat or reaction heat released from each cell 1 is easily released, whereas the central cell 1a is easily heated by Joule heat or reaction heat emitted from each cell 1, since the end cells 1b are disposed on both sides. Therefore, the alloy member 4 of the central cell 1a has a temperature higher than the alloy member 4 of the end cell 1b, and thus a large thermal stress is likely to occur in the alloy member 4 of the central cell 1a.

Therefore, in this embodiment, the number of the separation inhibiting portions provided on the alloy member 4 of the central cell 1a is larger than the number of the separation inhibiting portions provided on the alloy member 4 of the end cells 1b. As a result, the coating film 42 in the alloy member 4 of the central cell 1a can be prevented from separating from the base member 41, so that the durability of the cell stack 11 as a whole can be improved.

As long as the separation inhibiting portion has a function of inhibiting the coating film 42 from separating from the base member 41, its configuration is not particularly limited. The separation inhibiting portion may be, for example, something that enhances the adhesion force (or the bonding force) of the coating film 42 to the base member 41 or relaxes the thermal stress generated between the base member 41 and the coating film 42.

Figure 4:
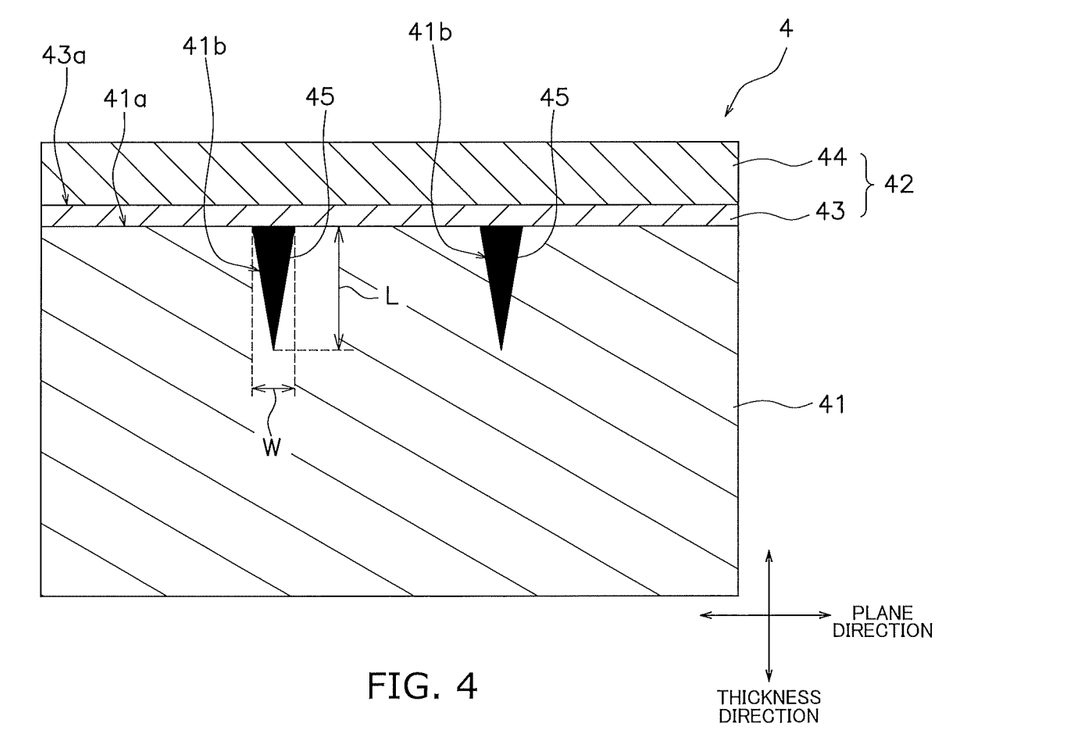
FIG. 4 is a cross-sectional view showing specific example 1 of a separation inhibiting portion according to the first embodiment.
Figure 5:
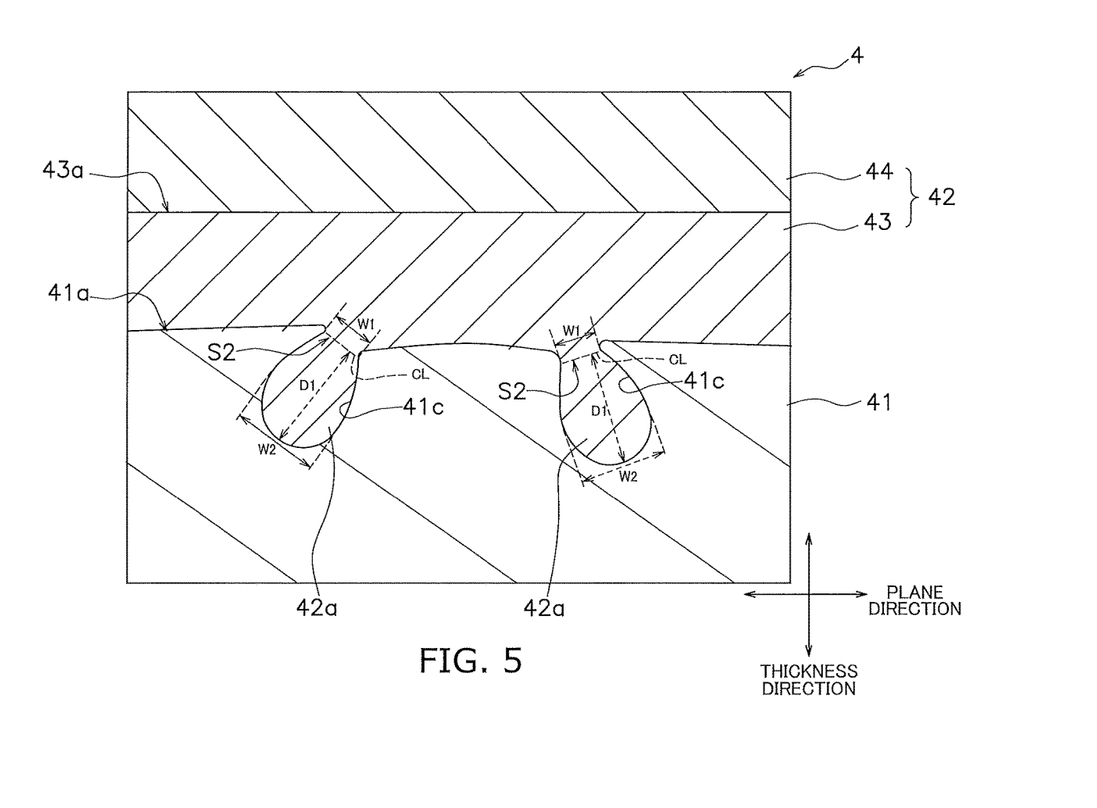
FIG. 5 is a cross-sectional view showing specific example 2 of the separation inhibiting portion according to the first embodiment.
Figure 6:
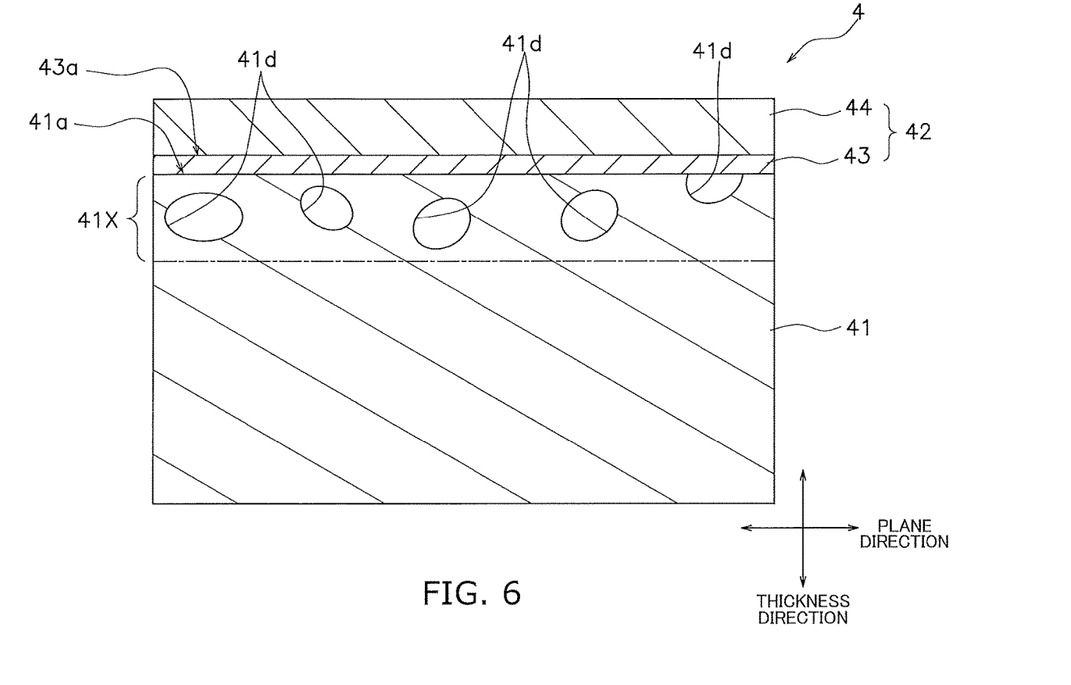
FIG. 6 is a cross-sectional view showing specific example 3 of the separation inhibiting portion according to the first embodiment.

Hereinafter, specific examples of the separation inhibiting portion will be described with reference to FIGS. 4 to 6. FIGS. 4 to 6 are cross sections schematically showing the structure near the surface of the alloy member 4. FIGS. 4 to 6 illustrate a cross section perpendicular to the surface of the alloy member 4.

Specific Example 1 of Separation Inhibiting Portion

In FIG. 4, "an anchor portion 45" is illustrated as an example of the separation inhibiting portion. The anchor portion 45 has a function of increasing the adhesion of the coating film 42 to the base member 41.

The anchor portion 45 is disposed in a recess 41b formed in the surface 41a of the base member 41. The anchor portion 45 is connected to the coating film 42 near the opening of the recess 41b. Specifically, in the example illustrated in FIG. 4, the anchor portion 45 is connected to a chromium oxide film 43 of the coating film 42. The anchoring effect generated by the anchor portion 45 being locked in the recess 41b can increase the adhesion of the coating film 42 to the base member 41. As a result, it is possible to inhibit the coating film 42 from separating from the base member 41.

Then, the number of the anchor portions 45 provided on the alloy member 4 of the central cell 1a is larger than the number of the anchor portions 45 provided on the alloy member 4 of the end cell 1b. As a result, the coating film 42 in the alloy member 4 of the central cell 1a can be prevented from separating from the base member 41, so that the durability of the cell stack 11 as a whole can be improved.

"The number of the anchor portions 45" means the number of the anchor portions 45 that exists for every 10 mm outer-edge length (stretched length) of the surface 41a when the base member 41 is observed in cross section at the center of the alloy member 4 in the flow direction of the fuel gas. The cross section of the base member 41 is observed on an image magnified 1000 to 20000 times by an FE-SEM (Field Emission-Scanning Electron Microscope).

Although the number of the anchor portions 45 in the alloy member 4 of the central cell 1a is not particularly limited, considering the effect of inhibiting the coating film 42 from separating, the number of the anchor portions 45 for every 10 mm outer-edge length is preferably 3 or more, more preferably 6 or more, and particularly preferably 10 or more. Although the number of the anchor portions 45 in the alloy member 4 of the end cell 1b is not particularly limited, considering the effect of inhibiting the coating film 42 from separating, the number of the anchor portions 45 for every 10 mm outer-edge length is preferably 1 or more, more preferably 2 or more, and particularly preferably 5 or more.

The anchor portion 45 contains an oxide of an element that has an equilibrium oxygen pressure lower than an equilibrium oxygen pressure of Cr (hereinafter referred to as "low equilibrium oxygen pressure element"). That is, the anchor portion 45 contains an oxide of a low equilibrium oxygen pressure element that has a greater affinity for oxygen than Cr and is easily oxidized. Therefore, during the operation of the cell stack device 10, oxygen that permeates the coating film 42 is preferentially taken into the anchor portion 45, so that the base member 41 surrounding the anchor portion 45 can be inhibited from being oxidized. Accordingly, the shape of the anchor portion 45 can be maintained, and thus an anchoring effect of the anchor portion 45 can be obtained for a long period. As a result, the adhesion of the coating film 42 to the base member 41 can be maintained for a long period.

Although examples of the low equilibrium oxygen pressure element include Al (aluminum), Ti (titanium), Ca (calcium), Si (silicon), Mn (manganese) or the like, it is not limited thereto. Although oxides of the low equilibrium oxygen pressure elements include $Al_2O_3$, $TiO_2$, CaO, $SiO_2$, MnO, $Mn_3O_4$, $MnCr_2O_4$ or the like, it is not limited thereto.

The content rate of the low equilibrium oxygen pressure element in the anchor portion 45 is preferably 0.01 or more in the cation ratio when the mole ratio of each element to the sum of all the constituent elements except oxygen is defined as the cation ratio. As a result, oxidation of the base member 41 surrounding the anchor portion 45 can be further inhibited, so that the adhesion of the coating film 42 to the base member 41 can be maintained for a longer period. The content rate of the low equilibrium oxygen pressure element in the anchor portion 45 is more preferably 0.05 or more, and particularly preferably 0.10 or more in the cation ratio.

The content rate of the low equilibrium oxygen pressure element in the anchor portion 45 is obtained as follows. First, with respect to each of the 20 anchor portions 45 randomly selected from the above-mentioned FE-SEM image, the content rate of the low equilibrium oxygen pressure element in the cation ratio is measured by using an EDS (energy dispersive X-ray spectrometer) at 10 points which divide the actual length of the anchor portion 45 into 11 equal parts. Next, the maximum value is selected from the content rates measured at 10 points for each of the 20 anchor portions 45. Next, the maximum values selected for each of the 20 anchor portions 45 are arithmetically averaged. The value obtained by this arithmetic average is the content rate of the low equilibrium oxygen pressure element in the anchor portion 45. When 20 anchor portions 45 cannot be observed in one cross section, 20 anchor portions 45 may be selected from a plurality of cross sections. The actual length of the anchor portion 45 is the total length of the line connecting the midpoints of the anchor portion 45 in the plane direction parallel to the surface 41a of the base member 41. Although the actual length of the anchor portion 45 is not particularly limited, it can be 2 µm or more and 30 µm or less, for example.

The anchor portion 45 may contain one type of low equilibrium oxygen pressure element or may contain two or more types of low equilibrium oxygen pressure element. For example, the anchor portion 45 may be constituted by $Al_2O_3$ or may be constituted by a mixture of $Al_2O_3$ and $TiO_2$.

Further, the anchor portion 45 may partially contain chromium oxide. However, the content rate of chromium in the anchor portion 45 is preferably 0.95 or less, more preferably 0.90 or less in the cation ratio.

The vertical depth L of the anchor portion 45 is not particularly limited and can be 0.5 to 15 µm. However, considering a sufficient anchoring effect, it is preferably 1.0 µm or more and more preferably 1.5 µm or more. Although the width W of the anchor portion 45 is not particularly limited and can be 0.1 to 3.5 µm, considering a sufficient anchoring effect, it is preferably 0.15 µm or more and more preferably 0.2 µm or more. Further, considering a sufficient anchoring effect, the width W is preferably smaller than the vertical depth L, and the ratio of the width W to the depth L (W/L) is preferably 0.5 or less and more preferably 0.3 or less. The vertical depth L is the depth of the anchor portion 45 in the thickness direction of the base member 41. The width W is a contact width between the anchor portion 45 and the coating film 42 in a direction parallel to the surface 41a of the base member 41.

The cross-sectional shape of the anchor portion 45 is not particularly limited, and may be, for example, a wedge shape, a semicircular shape, a rectangular shape, or another complicated shape. In FIG. 4, the anchor portion 45 having a wedge-shaped cross section is illustrated, and the deepest part of the anchor portion 45 has an acute angle. However, the deepest part of the anchor portion 45 may have an obtuse angle or a rounded shape. The anchor portion 45 need not extend straight toward the inside of the base member 41. For example, the anchor portion 45 may be formed obliquely to the thickness direction or may be wholly or partially curved.

The vertical depth L, the width W, and the cross-sectional shape of the anchor portion 45 may be different from each anchor portion 45.

The alloy member 4 according to the specific example 1 can be formed by the following procedure.

First, the recess 41b is formed on the surface 41a of the base member 41 by shot peening or sandblasting. At this time, more recesses 41b are formed in the alloy member 4 of the central cell 1a than in the alloy member 4 of the end cell 1b.

Next, a paste adding ethyl cellulose and terpineol to a powder containing a low equilibrium oxygen pressure element is filled in the recess 41b, and the base member 41 is heat-treated in an air atmosphere (at 800 to 900 degrees C., for 5 to 20 hours). As a result, the anchor portion 45 is formed in the recess 41b and the chromium oxide film 43 is formed on the surface 41a of the base member 41.

Next, the chromium oxide film 43 is coated with a ceramic material paste and heat-treated (at 800 to 900 degrees C., for 1 to 5 hours). As a result, the covering film 44 is formed.

Specific Example 2

FIG. 5 is a cross-sectional view showing "an embedded portion 42a" as an example of the separation inhibiting portion. The embedded portion 42a has a function of increasing the adhesion of the coating film 42 to the base member 41.

The embedded portion 42a is a part of the coating film 42. In this embodiment, the embedded portion 42a is a part of the chromium oxide film 43 of the coating film 42.

The embedded portion 42a is disposed in the recess 41c formed on the surface 41a of the base member 41. The embedded portion 42a may be filled in the entire recess 41c or may be disposed in a part of the recess 41c.

The embedded portion 42a is constricted at an opening S2 of the recess 41c. That is, the embedded portion 42a is locally thin near the opening S2. Such a bottleneck structure can increase the adhesive force of the coating film 42 to the base member 41 by an anchoring effect generated by the embedded portion 42a being locked in the recess 41c. As a result, it is possible to inhibit the coating film 42 from separating from the base member 41.

Then, the number of the embedded portions 42a provided in the alloy member 4 of the central cell 1a is larger than the number of the embedded portions 42a provided in the alloy member 4 of the end cell 1b. As a result, separation of the coating film 42 on the alloy member 4 of the central cell 1a can be particularly inhibited, so that the durability of the cell stack 11 as a whole can be improved.

"The number of the embedded portions 42a" means the number of the embedded portions 42a that exists for every 10 mm outer-edge length (stretched length) of the surface 41a when the substrate 41 is observed in cross section. The cross-section observation of the base member 41 is performed on an image magnified 1000 to 20000 times by FE-SEM.

Although the number of the embedded portions 42a in the alloy member 4 of the central cell 1a is not particularly limited, considering the effect of inhibiting the coating film 42 from separating, the number of the embedded portions 42a for every 10 mm outer-edge length is preferably 3 or more, more preferably 6 or more, and particularly preferably 10 or more. Although the number of the embedded portions 42a in the alloy member 4 of the end cell 1b is not particularly limited, considering the effect of inhibiting the coating film 42 from separating, the number of the embedded portions 42a for every 10 mm outer-edge length is preferably 1 or more, more preferably 2 or more, and particularly preferably 5 or more.

In this embodiment, "the embedded portion 42a is constricted at the opening S2" means that the width W2 of the embedded portion 42a is larger than the opening width W1 of the opening S2 in a cross section perpendicular to the surface 41a of the base member 41. The width W2 of the embedded portion 42a is the maximum dimension of the embedded portion 42a in the direction parallel to the straight line CL that defines the opening width W1 of the opening S2. The straight line CL is a straight line connecting two points which defines the shortest distance of the opening S2.

Although the depth D1 of the embedded portion 42a is not particularly limited, it may be, for example, 0.5 to 300 μm. As illustrated in FIG. 5, the depth D1 of the embedded portion 42a is the maximum dimension of the embedded portion 42a in the direction perpendicular to the straight line CL that defines the opening width W1 of the opening S2. Considering a sufficient anchoring effect, the depth D1 is preferably 0.5 μm or more, more preferably 1.0 μm or more, and further preferably 1.5 μm or more.

Although the width W2 of the embedded portion 42a is not particularly limited, it may be, for example, 0.5 to 35 μm. Considering a sufficient anchoring effect, the width W2 of the embedded portion 42a is preferably 101% or more of the opening width W1 of the opening S2, more preferably 105% or more thereof, and particularly preferably 110% or more thereof.

The cross-sectional shape of the embedded portion 42a is not particularly limited, and it may be, for example, an elliptical shape, a wedge shape, a semicircular shape, a rectangular shape, or another complicated shape. Although in FIG. 5, the embedded portion 42a having a substantially elliptical cross-sectional shape is illustrated, and the deepest portion of the embedded portion 42a is curved and rounded, it may be a curved wedge shape. The embedded portion 42a may extend straight toward the inside of the base member 41 or may be wholly or partially curved.

The depth D1, the width W2, and the cross-sectional shape of the embedded portion 42a may be different for each embedded portion 42a.

The alloy member 4 according to the specific example 2 can be formed by the following procedure.

First, the recess 41c is formed on the surface 41a of the base member 41 by using shot peening or sandblasting. At this time, more recesses 41c are formed in the alloy member 4 of the central cell 1a than in the alloy member 4 of the end cell 1b.

Next, by rolling a roller on the surface 41a of the base member 41, the opening S2 of the recess 41c is narrowed.

Next, after the chromium oxide paste is applied on the surface 41a of the base member 41 and filled in the recess 41c at the same time, the base member 41 is heat-treated in an air atmosphere (at 800 to 900 degrees C., for 5 to 20 hours). As a result, the chromium oxide film 43 is formed on the surface 41a of the base member 41, and the embedded portion 42a embedded in the recess 41c is formed.

Next, the chromium oxide film 43 is coated with a ceramic material paste and heat-treated (at 800 to 900 degrees C., for 1 to 5 hours). As a result, the covering film 44 is formed.

Specific Example 3

FIG. 6 is a cross-sectional view showing "the pore 41d" as an example of the separation inhibiting portion having a function of relaxing the thermal stress generated inside the alloy member 4.

The base member 41 includes pores 41d in a surface region 41X that is a region within 30 μm from the surface 41a. The equivalent circle diameter of the pores 41d is 0.5 μm or more and 20 μm or less. Thereby, the flexibility of the surface region 41X of the base member 41 can be improved, so that the thermal stress generated inside the alloy member 4 can be relaxed by the surface region 41X. As a result, it is possible to inhibit the coating film 42 from separating from the base member 41.

The number of the pores 41d provided in the alloy member 4 of the central cell 1a is larger than the number of pores 41d provided in the alloy member 4 of the end cell 1b. As a result, the separation of the coating film 42 on the alloy member 4 of the central cell 1a can be particularly inhibited, so that the durability of the cell stack 11 as a whole can be improved.

"The number of the pores 41d" means the number of the pores 41d that exists for every 10 mm outer-edge length (stretched length) of the surface 41a when the substrate 41 is observed in cross section. The cross-section observation of the base member 41 is observed on an image magnified 1000 to 20000 times by FE-SEM. Further, "the equivalent circle diameter of the pores 41d" is the diameter of a circle having the same area as the pore 41d, which is the target for measuring "the number of the pores 41d".

Although the number of the pores 41d in the alloy member 4 of the central cell 1a is not particularly limited, considering the effect of inhibiting the coating film 42 from separating, the number of the pores 41d for every 10 mm outer-edge length is preferably 5 or more, more preferably 10 or more, and particularly preferably 15 or more. Although the number of the pores 41d in the alloy member 4 of the end cell 1b is not particularly limited, considering the effect of inhibiting the coating film 42 from separating, the number of the pores 41d for every 10 mm outer-edge length is preferably 2 or more, more preferably 4 or more, and particularly preferably 6 or more.

The aspect ratio of the pores 41d is preferably 3 or less. As a result, the pores 41d can be more easily deformed, so that the thermal stress generated inside the alloy member 4 can be relaxed by the surface region 41X. The aspect ratio of the pores 41d is a value obtained by dividing the maximum Feret diameter of the pores 41d by the minimum Feret diameter thereof. The maximum Feret diameter is a distance between two parallel straight lines when the pore 41d is sandwiched so that the distance between the two parallel straight lines is maximized on the above-mentioned FE-SEM image. The minimum Feret diameter is the distance between two parallel straight lines when the pore 41d is sandwiched so that the distance between two parallel straight lines is minimized on the above-mentioned FE-SEM image.

In addition, in the example illustrated in FIG. 6, the inside of each pore 41d is a hole. However, chromium oxide, alumina, titania, or a mixture thereof may be disposed inside each pore 41d.

The alloy member 4 according to the specific example 3 can be formed by the following procedure.

First, a recess is formed on the surface 41a of the base member 41 by using shot peening or sandblasting. At this time, more recesses are formed in the alloy member 4 of the central cell 1a than in the alloy member 4 of the end cell 1b.

Next, by rolling a roller on the surface 41a of the base member 41, the opening of the recess is closed to form the pore 41d.

Next, after the chromium oxide paste is applied on the surface 41a of the base member 41, the base member 41 is heat-treated in an air atmosphere (at 800 to 900 degrees C., for 5 to 20 hours). As a result, the chromium oxide film 43 is formed on the surface 41a of the base member 41.

Next, the chromium oxide film 43 is coated with a ceramic material paste and heat-treated (at 800 to 900 degrees C., for 1 to 5 hours). As a result, the covering film 44 is formed.

2. Variation of the First Embodiment

Structure of Cell Stack 20

Figure 7:
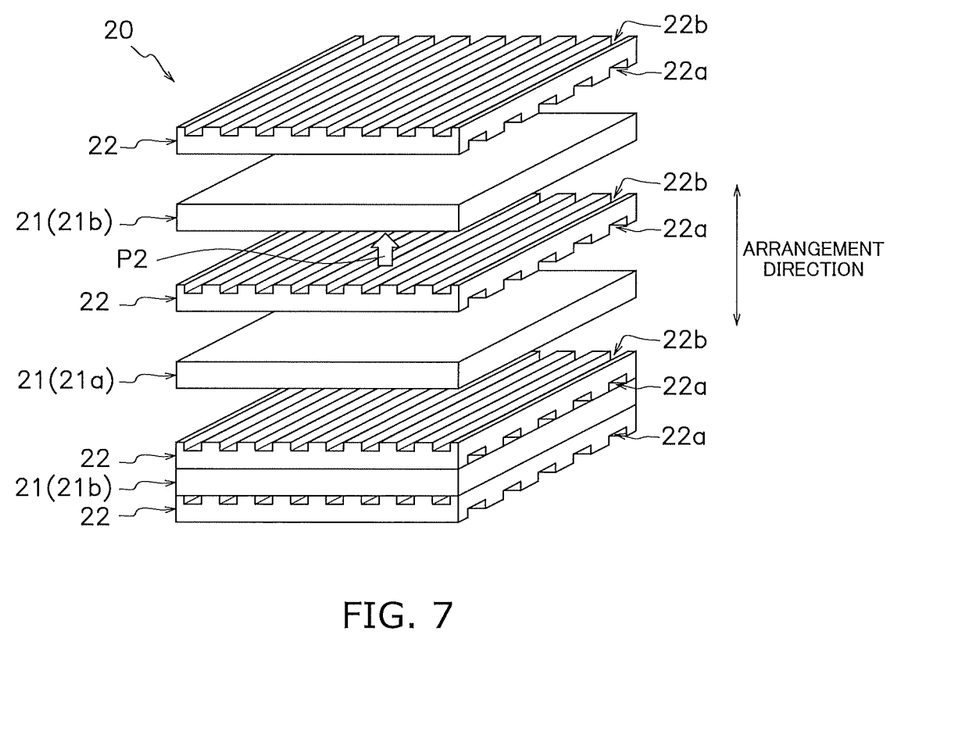
FIG. 7 is an exploded perspective view of a cell stack according to a variation of the first embodiment.

FIG. 7 is an exploded perspective view of the cell stack 20 according to the variation of the first embodiment. The cell stack 20 comprises a plurality of the fuel cells 21 and a plurality of the separators 22. The fuel cell 1 is an example of "the electrochemical cell" according to the present invention. In the following description, the fuel cell is abbreviated as "cell".

Each cell 21 and each separator 22 are alternately stacked in the arrangement direction. A plurality of the cells 21 is disposed in a line along the arrangement direction. The configuration of each cell 21 is as described in the first embodiment (see FIGS. 2 and 3). However, the cell 21 according to the present variation does not comprise the flow path member 3.

A plurality of the cells 21 includes a central cell 21a (an example of a central electrochemical cell) and two end cells 21b (an example of an end electrochemical cell) disposed on both sides of the central cell 21a in the arrangement direction. The arrangement of the central cells 21a and the end cells 21b is as described in the first embodiment. The number of the cells 21 can be changed as appropriate. When four or more cells 21 are provided, the total length of the cell stack 20 in the arrangement direction is divided into three equal parts, and the cells 21 disposed in the central part are the central cells 21a and the other cells 21 are the end, cells 21b.

The separator 22 is a plate-shaped member that has a conductivity and does not have a gas permeability. A plurality of gas flow paths 22a are formed on the first main surface of the separator 22. An oxidant gas is flowed through each first gas flow path 22a. Oxidant gas is supplied to the second electrode layer 9 of the cell 21. A plurality of second gas flow paths 22b are formed on the second main surface of the separator 22. Fuel gas is flowed through each second gas flow path 22b. Fuel gas is supplied to the first electrode layer 5 of the cell 21 through each through hole 4a formed in the alloy member 4 (see FIG. 2). Although each first gas flow path 22a and each second gas flow path 22b extend in directions orthogonal to each other in this embodiment, it is not limited thereto. Each first gas flow path 22a and each second gas flow path 22b may extend in a direction parallel to each other.

Here, in the end cell 21b, Joule heat or reaction heat released from each cell 21 is easily released, whereas the central cell 21a is easily heated by Joule heat or reaction heat emitted from each cell 21 since the end cell 21b are disposed on both sides. Therefore, the alloy member 4 of the central cell 21a has a temperature higher than the alloy member 4 of the end cell 21b, and thus a large thermal stress is likely to occur in the alloy member 4 of the central cell 21a.

Therefore, even in the present variation, the number of the separation inhibiting portions provided on the alloy member 4 of the central cell 21a is larger than the number of the separation inhibiting portions provided on the alloy member 4 of the end cell 21b. As a result, in the alloy member 4 of the central cell 21a, the coating film 42 can be prevented from separating from the base member 41, so that the durability of the cell stack 20 as a whole can be improved.

Although specific examples of the separation inhibiting portion include the anchor portion 45, the embedding portion 42a, and the pores 41d (see FIGS. 4 to 6) described in the first embodiment, specific examples are not limited thereto.

3. Second Embodiment

In the above-described first embodiment, in the cell stack 11 illustrated in FIG. 1, the number of the separation inhibiting portions provided on the alloy member 4 of the central cell 1a is larger than the number of the separation inhibiting portion provided on the alloy member 4 of the end cell 1b.

On the other hand, in the cell 1 according to this embodiment, a relatively large number of the separation inhibiting portions are provided in the downstream portion of the alloy member 4 which is located downstream in the flow direction of the gas flowing on the surface thereof.

As described above, in the above-described first embodiment, the alloy member 4 of the cell 1 that is likely to have a high temperature is provided with a large number of the separation inhibiting portions, whereas in this embodiment, a large number of the separation inhibiting portions are provided in a portion where the temperature is likely to be high in the alloy member 4.

Figure 8:
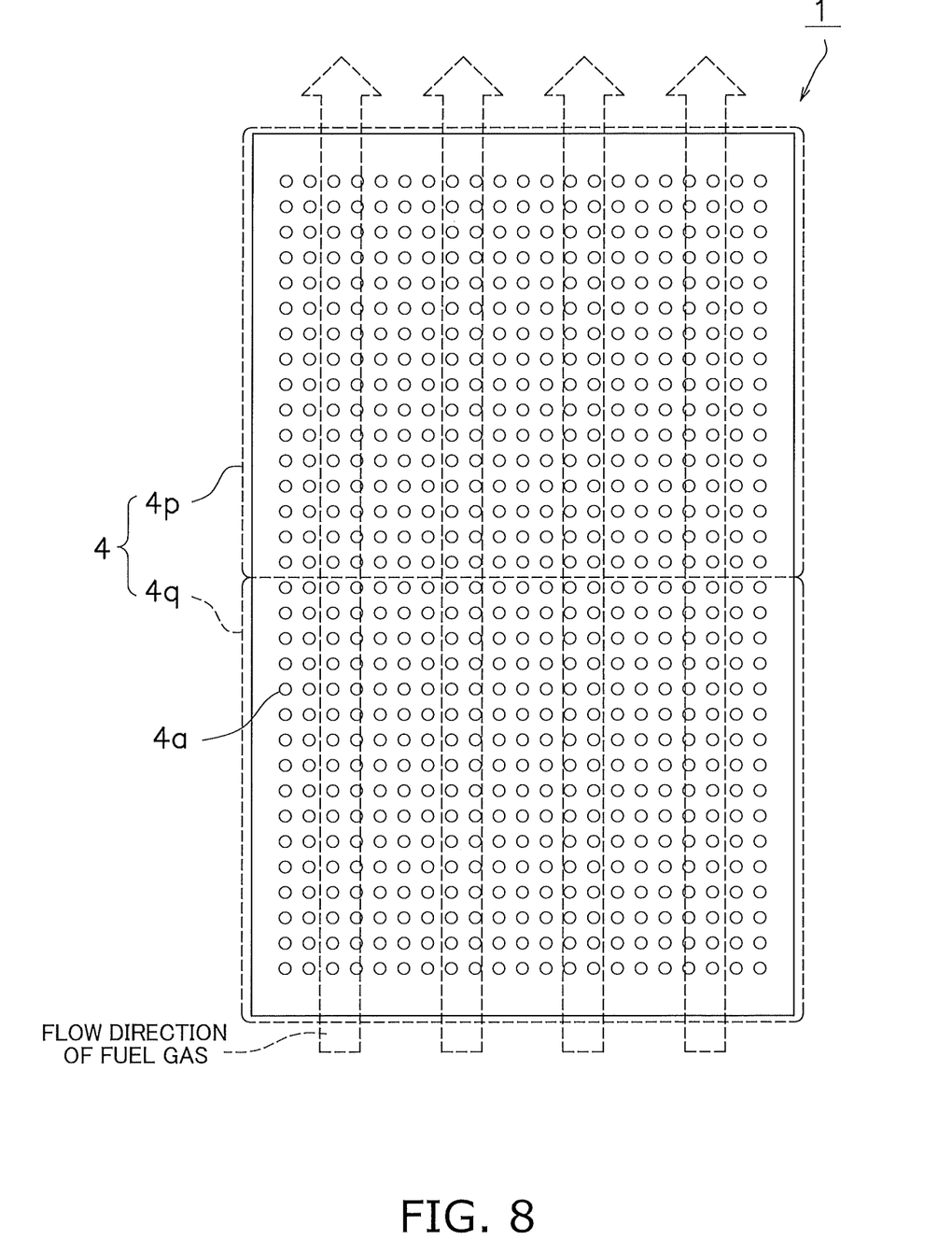
FIG. 8 is a plan view of the alloy member 4 according to the second embodiment.

FIG. 8 is a plan view of the alloy member 4 illustrated in FIG. 2 as viewed in the direction of an arrow P1. The gas (fuel gas in this embodiment) flowing on the surface of the alloy member 4 is gradually heated by the Joule heat and the reaction heat released from the cell 1, so that the temperature becomes higher from the upstream side to the downstream side. Therefore, the downstream portion 4p of the alloy member 4 has a temperature higher than that of the upstream portion 4q, so that a larger thermal stress is generated between the base member 41 and the coating film 42 in the downstream portion 4p than in the upstream portion 4q.

Therefore, in this embodiment, the number of the separation inhibiting portions provided in the downstream portion 4p of the alloy member 4 is larger than the number of the separation inhibiting portions provided in the upstream portion 4q of the alloy member 4. As the result, at the downstream portion 4p, the coating film 42 can be prevented from separating from the base member 41 at the downstream portion 4p, so that the durability of the cell 1 as a whole can be improved.

Although specific examples of the separation inhibiting portion include the anchor portion 45, the embedded portion 42a, and the pores 41d (see FIGS. 4 to 6) described in the first embodiment, specific examples are not limited thereto.

Further, the downstream portion 4p and the upstream portion 4q can be distinguished with reference to the center of the alloy member 4 in the gas flow direction.

Further, the plurality of the cells 1 only have to include at least one cell 1 in which the number of the separation inhibiting portions provided in the downstream portion 4p is larger than the number of the separation inhibiting portions provided in the upstream portion 4q.

4. Variation of the Second Embodiment

In the above-described variation of the first embodiment, in the cell stack 20 illustrated in FIG. 7, the number of the separation inhibiting portions provided on the alloy member 4 of the central cell 21a is larger than the number of the separation inhibiting portions provided on the alloy member 4 of the central cell 21b.

On the other hand, in the cell 21 according to the present variation, a relatively large number of separation inhibiting portions are provided at the downstream portion of the alloy member 4 located on the downstream side in the flow direction of the gas flowing on the surface thereof.

As described above, in the above-described first embodiment, the alloy member 4 of the cell 1 that is likely to become high temperature is provided with a large number of the separation inhibiting portions, whereas in this embodiment, a large number of the separation inhibiting portions are provided in a portion where the temperature is likely to be high in the alloy member 4.

Figure 9:
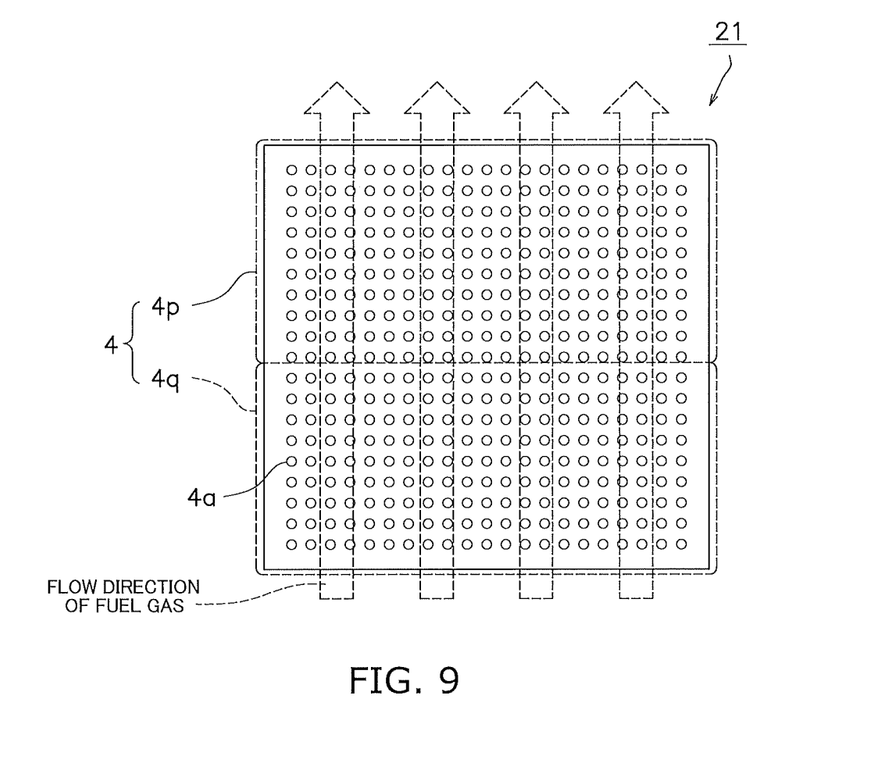
FIG. 9 is a plan view of the alloy member 4 according to a variation of the second embodiment.

FIG. 9 is a plan view of the cell 21 illustrated in FIG. 7 viewed from the direction of an arrow P2. The gas (fuel gas in the present variation) flowing on the surface of the alloy member 4 is gradually heated by the Joule heat and the reaction heat released from the cell 21, so that the temperature becomes higher from upstream to downstream. Therefore, the downstream portion 4p of the alloy member 4 has a temperature higher than the upstream portion 4q, so that a larger thermal stress is generated between the base member 41 and the coating film 42 in the downstream portion 4p than in the upstream portion 4q.

Therefore, in the present variation, the number of the separation inhibiting portions provided in the downstream portion 4p of the alloy member 4 is larger than the number of the separation inhibiting portions provided in the upstream portion 4q of the alloy member 4. As a result, the coating film 42 can be prevented from separating from the base member 41 in the downstream portion 4p, so that the durability of the cell 21 as a whole can be improved.

Although specific examples of the separation inhibiting portion include the anchor portion 45, the embedded portion 42a, and the pores 41d (see FIGS. 4 to 6) described in the first embodiment, specific examples are not limited thereto.

Further, the downstream portion 4p and the upstream portion 4q are distinguished with reference to the center of alloy member 4 in the gas flow direction.

Further, the plurality of the cells 21 only have to include at least one cell 21 in which the number of the separation inhibiting portions provided in the downstream portion 4p is larger than the number of the separation inhibiting portions provided in the upstream portion 4q.

5. Other Embodiments

The present invention is not limited to the above embodiments, and various variations or changes can be made without departing from the scope of the present invention.

Although in the first embodiment, the second embodiment and their variations, the coating film 42 includes the chromium oxide film 43 and the covering film 44, it may include at least one of the chromium oxide film 43 and the covering film 44. Therefore, the coating film 42 may be substantially constituted by only the covering film 44 or may be substantially constituted by only the chromium oxide film 43.

Although in the first embodiment, the second embodiment and their variations, the intermediate layer 6 and the barrier layer 8 are included, it may exclude at least one of the intermediate layer 6 and the barrier layer 8.

Although in the first embodiment, the second embodiment and their variations, the first electrode layer 5 functions as an anode and the second electrode layer 9 functions as a cathode, the first electrode layer 5 may function as a cathode and the second electrode layer 9 may function as an anode. In this case, the constituent materials of the first electrode layer 5 and the second electrode layer 9 are exchanged, and further fuel gas is flowed to the outer surface of the first electrode layer 5 and oxidant gas may be flowed to the flow path 3S.

The invention claimed is:

1. A cell stack comprising:
   a plurality of electrochemical cells disposed in an arrangement direction,
   each of the plurality of the electrochemical cells including an alloy member, a first electrode layer supported by the alloy member, a second electrode layer, and an electrolyte layer disposed between the first electrode layer and the second electrode layer,
   each alloy member including a base member constituted by an alloy material containing chromium, a coating film that covers at least a part of a surface of the base member, and at least one separation inhibiting portion that inhibits the coating film from separating from the base member,
   the plurality of electrochemical cells including a central electrochemical cell located at a central portion in the arrangement direction and an end electrochemical cell located at an end portion in the arrangement direction, and
   the central electrochemical cell has more separation inhibiting portions than the alloy member of the end electrochemical cell,
   wherein the at least one separation inhibiting portion is at least one member selected from the group consisting of an anchor portion containing an element having an equilibrium oxygen pressure less than an equilibrium oxygen pressure of chromium, an embedded portion of the coating film embedded in a first recess which is formed in the surface of the base member and is narrower at a top portion of an opening of the first recess, and a pore enclosed by the base member and formed in an interfacial region within 30 μm from an interface between the base member and the coating film,
   the anchor portion is disposed in a second recess formed on the surface of the base member and contacts with both the base member and the coating film, and
   an inside of the pore is an unfilled cavity.

2. The cell stack according to claim 1, wherein the at least one separation inhibiting portion comprises the pore and an equivalent circle diameter of the pore in a cross section of the base member is from 0.5 μm-20 μm.

3. An electrochemical cell comprising:
an alloy member;
a first electrode layer supported by the alloy member;
a second electrode layer; and
an electrolyte layer disposed between the first electrode layer and the second electrode layer,
the alloy member including a base member constituted by an alloy material containing chromium, a coating film that covers at least a part of a surface of the base member, and separation inhibiting portions that inhibit the coating film from separating from the base member,
the alloy member including a downstream portion located on a downstream side in a flow direction of a gas flowing on a surface of the alloy member, and an upstream portion located on an upstream side of the downstream portion in the flow direction, and
the downstream portion has more separation inhibiting portions than the upstream portion,
wherein the at least one separation inhibiting portion is at least one member selected from the group consisting of an anchor portion containing an element having an equilibrium oxygen pressure less than an equilibrium oxygen pressure of chromium, an embedded portion of the coating film embedded in a first recess which is formed in the surface of the base member and is narrower at a top portion of an opening of the first recess, and a pore enclosed by the base member and formed in an interfacial region within 30 μm from an interface between the base member and the coating film,
the anchor portion is disposed in a second recess formed on the surface of the base member and contacts with both the base member and the coating film, and
an inside of the pore is an unfilled cavity.

4. The electrochemical cell according to claim 3, wherein the at least one separation inhibiting portion comprises the pore and an equivalent circle diameter of the pore in a cross section of the base member is from 0.5 μm-20 μm.

5. The cell stack according to claim 1, wherein the at least one separation inhibiting portion comprises the anchor portion.

6. The cell stack according to claim 1, wherein the at least one separation inhibiting portion comprises the embedded portion of the coating film.

7. The electrochemical cell according to claim 3, wherein the at least one separation inhibiting portion comprises the anchor portion.

8. The electrochemical cell according to claim 3, wherein the at least one separation inhibiting portion comprises the embedded portion of the coating film.

* * * * *